(12) United States Patent
Brandenburg et al.

(10) Patent No.: US 11,305,484 B2
(45) Date of Patent: Apr. 19, 2022

(54) LAMINATED OBJECT ADDITIVE MANUFACTURING FOR VENEER APPLICATIONS

(71) Applicant: Goodrich Corporation, Charlotte, NC (US)

(72) Inventors: Loren O. Brandenburg, Stafford Springs, CT (US); Joseph M. Tomashek, Naperville, IL (US); Nicholas W. Linck, LaGrange, KY (US); Christopher L. Chapman, Georgetown, IN (US); Brian K. Barnett, New Albany, IN (US); Ricardo O. Brown, West Hartford, CT (US); Shawn K. Reynolds, Byron, IL (US); Edward D. Thompson, Jeffersonville, IN (US)

(73) Assignee: Goodrich Corporation, Charlotte, NC (US)

( * ) Notice: Subject to any disclaimer, the term of this patent is extended or adjusted under 35 U.S.C. 154(b) by 107 days.

(21) Appl. No.: 16/717,502

(22) Filed: Dec. 17, 2019

(65) Prior Publication Data
US 2021/0178663 A1  Jun. 17, 2021

(51) Int. Cl.
*B29C 64/147* (2017.01)
*B33Y 10/00* (2015.01)
(Continued)

(52) U.S. Cl.
CPC ............ *B29C 64/147* (2017.08); *B33Y 10/00* (2014.12); *B33Y 70/00* (2014.12); *B29K 2101/12* (2013.01); *B29K 2105/256* (2013.01)

(58) Field of Classification Search
None
See application file for complete search history.

(56) References Cited

U.S. PATENT DOCUMENTS 4,364,984 A * 12/1982 Wentworth ............ B27N 3/143
428/106
8,608,898 B2   12/2013 Tagliabue
(Continued)

FOREIGN PATENT DOCUMENTS

CN     102431065 A     5/2012
EP      2927018 A1    10/2015
(Continued)

OTHER PUBLICATIONS

"Laminated object manufacturing," (May 11, 2017), Wikipedia, https://web.archive.org/web/20170714093600/https://en.wikipedia.org/wiki/Laminated_object_manufacturing. (Year: 2017).*

(Continued)

*Primary Examiner* — Matthew J Daniels
*Assistant Examiner* — Paul Spiel
(74) *Attorney, Agent, or Firm* — Suiter Swantz pc llo

(57) ABSTRACT

A method of laminated object additive manufacturing for veneer applications may include, but is not limited to, loading at least one veneer into a laminated object additive manufacturing device, feeding a first layer of the at least one veneer over a working surface of the laminated object additive manufacturing device, cutting the first layer of the at least one veneer to form a first portion of the veneer product, actuating the working surface, feeding an additional layer of the at least one veneer over the first layer of the at least one veneer, and cutting the additional layer of the at least one veneer to form an additional portion of the veneer product. The at least one veneer may be fabricated from a mixture including wood product and a binder. The first layer and/or the additional layer may be cured.

16 Claims, 11 Drawing Sheets

(51) Int. Cl.
    *B33Y 70/00*     (2020.01)
    *B29K 101/12*    (2006.01)
    *B29K 105/00*    (2006.01)

(56) References Cited

U.S. PATENT DOCUMENTS

| | | |
|---|---|---|
| 10,000,041 B2 | 6/2018 | Penaforte et al. |
| 2004/0250906 A1* | 12/2004 | Becker-Weimann .... B05D 7/08 |
| | | 144/332 |
| 2008/0213432 A1 | 9/2008 | Engel et al. |
| 2008/0213532 A1* | 9/2008 | Engel .................. B27L 5/00 |
| | | 428/106 |
| 2018/0370070 A1* | 12/2018 | Stopfer .................. B27D 1/08 |
| 2019/0330531 A1* | 10/2019 | Wiehn ................... C09K 21/02 |
| 2020/0398481 A1* | 12/2020 | Mantell ................ B29C 64/205 |

FOREIGN PATENT DOCUMENTS

| | | |
|---|---|---|
| EP | 3526035 A1 | 8/2019 |
| GB | 2113604 A | 8/1983 |
| JP | H0481866 A | 3/1992 |
| WO | 2018194446 A1 | 10/2018 |

OTHER PUBLICATIONS

Extended Search Report for European Application No. 20215220.3 dated May 6, 2021, 6 pages.

\* cited by examiner

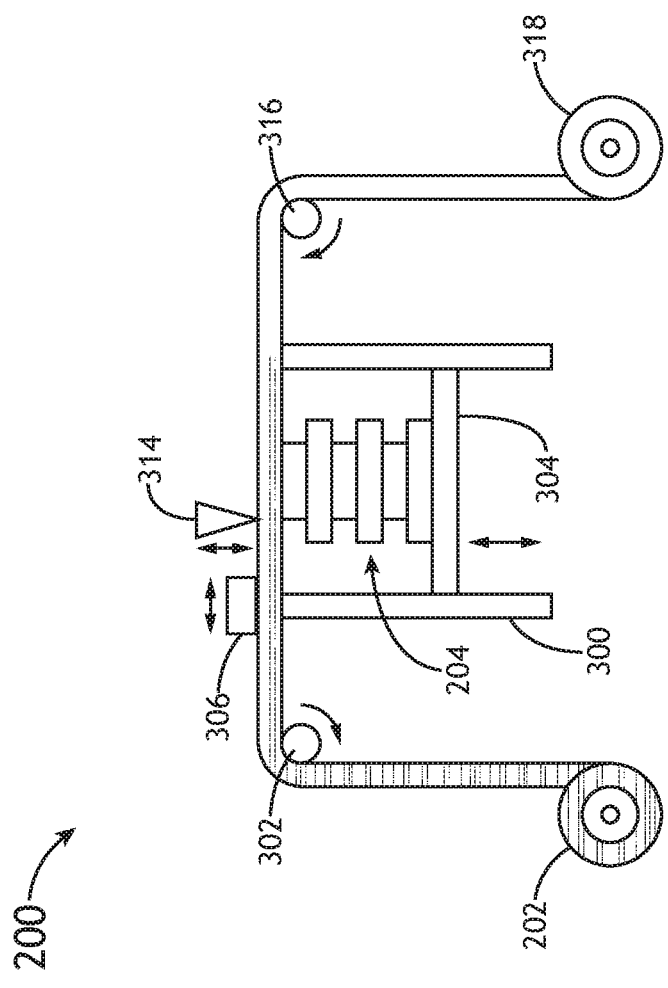
FIG.3B
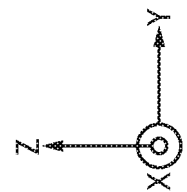

LAMINATED OBJECT ADDITIVE MANUFACTURING FOR VENEER APPLICATIONS

BACKGROUND

Consumers in the aviation or automotive industry may require matching veneer in sheet or core form across a purchased lineup or fleet of vehicles (e.g., airplanes, automobiles, or like). In the case of natural lumber, a color, design, grain width, and/or grain pattern for a particular veneer may be different, whether manufactured from lumber of different species or lumber from the same species. In some cases, only one log out of thousands may meet industry requirements, meaning the use of the particular veneer for installed panels and/or spare panels may be largely limited to an amount of square footage the log provides. As such, matching veneer manufactured from natural lumber in sheet or core form may be difficult.

SUMMARY

A method of laminated object additive manufacturing for veneer applications is disclosed, in accordance with one or more embodiments of the disclosure. The method may include, but is not limited to, loading at least one veneer into a laminated object additive manufacturing device. The at least one veneer may be fabricated from a mixture including wood product and a binder. The method may include, but is not limited to, feeding a first layer of the at least one veneer over a working surface of the laminated object additive manufacturing device. The method may include, but is not limited to, cutting the first layer of the at least one veneer to form a first portion of the veneer product. The method may include, but is not limited to, actuating the working surface. The method may include, but is not limited to, feeding an additional layer of the at least one veneer over the first layer of the at least one veneer. The method may include, but is not limited to, cutting the additional layer of the at least one veneer to form an additional portion of the veneer product.

In some embodiments, the method may include, but is not limited to, curing the first layer to form the first portion of the veneer product.

In some embodiments, the method may include, but is not limited to, curing the first layer and the additional layer to form the additional portion of the veneer product.

In some embodiments, the at least one veneer may include a plurality of veneers. The method may include, but is not limited to, feeding a first layer of each of the plurality of veneers over the working surface of the laminated object additive manufacturing device. The method may include, but is not limited to, cutting the first layer of each of the plurality of veneers to form the portion of the veneer product. The method may include, but is not limited to, actuating the working surface. The method may include, but is not limited to, feeding an additional layer of each of the plurality of veneers over the first set of layers of the plurality of veneers. The method may include, but is not limited to, cutting the additional layer of each of the plurality of veneers to form the additional portion of the veneer product.

In some embodiments, the method may include, but is not limited to, curing the first layer of each of the plurality of veneers to form the first portion of the veneer product.

In some embodiments, the method may include, but is not limited to, curing the first layer of each of the plurality of veneers and the additional layer of each of the plurality of veneers to form the additional portion of the veneer product.

In some embodiments, the at least one veneer may include at least one roll of veneer.

In some embodiments, the binder may be a thermoplastic.

In some embodiments, the binder may be an adhesive.

In some embodiments, the mixture may further include at least one of a fire-retardant or a fire-resistant material.

In some embodiments, the mixture may further include a metal.

A method of laminated object additive manufacturing for veneer applications is disclosed, in accordance with one or more embodiments of the disclosure. The method may include, but is not limited to, loading at least one veneer into a laminated object additive manufacturing device. The at least one veneer may be fabricated from wood product and a binder. The at least one veneer may be loaded into a feed tray of the laminated object additive manufacturing device. The method may include, but is not limited to, stacking the at least one veneer within a curing tray of the laminated object additive manufacturing device. The method may include, but is not limited to, curing the at least one veneer to form at least a portion of a veneer product.

In some embodiments, the method may include, but is not limited to, applying an additional binder to the at least one veneer while the at least one veneer passes from the feed tray to the curing tray.

In some embodiments, the at least one veneer may include a plurality of sheets of veneer.

In some embodiments, the at least one veneer may include a plurality of veneer log slices.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 3B illustrates a laminated object additive manufacturing device for veneer applications, in accordance with one or more embodiments of the disclosure;

DETAILED DESCRIPTION OF THE INVENTION

Figure 1:
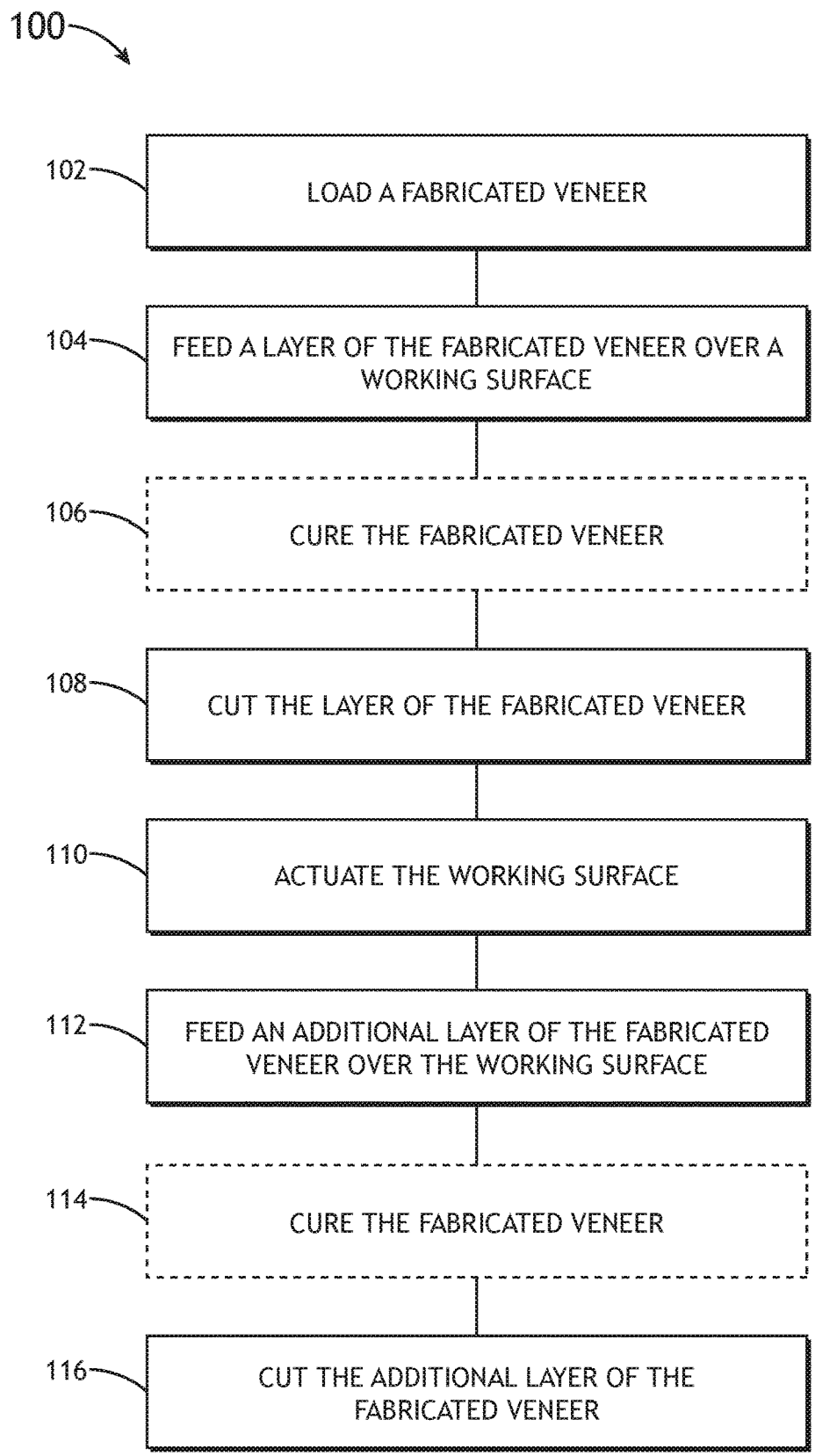
FIG. 1 is a flow diagram illustrating a method or process of laminated object additive manufacturing for veneer applications, in accordance with one or more embodiments of the disclosure.

Reference will now be made in detail to the subject matter disclosed, which is illustrated in the accompanying drawings.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

FIGS. 1-9 generally illustrate laminated object additive manufacturing for veneer applications, in accordance with one or more embodiments of the disclosure.

With natural veneer, lumber may be cut from trees of the same species or different species. However, the trees may be located in numerous places around the world, which may result in variances of color, design, grain width, and/or grain pattern within the lumber. In some cases, only one log out of thousands may meet industry requirements, meaning the use of the particular veneer for installed panels and/or spare panels may be largely limited to an amount of square footage the log provides.

With composite veneer, a tree may be broken down and meshed into a block with the addition of color. Current methods of generating composite veneer, while more likely to match across different sources than natural veneer, may be cost-prohibitive in terms of long lead time and/or the size of the bulk order that may be required.

As such, it would be beneficial to use laminated object additive manufacturing for veneer applications to produce veneer products, the veneer products including matching color, design, grain width, and grain pattern from fabricated veneer. The fabricated veneer may address or offset the possibility of variances within the natural veneer. The fabricated veneer may be cut to custom size for the veneer products in a more cost-effective manner than the composite veneer.

Figure 2:
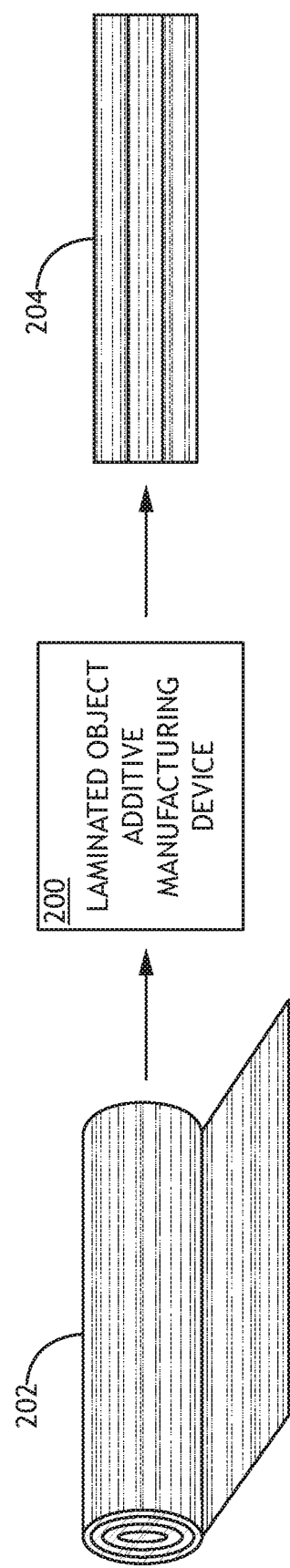
FIG. 2 is a simplified schematic illustrating a method or process of laminated object additive manufacturing for veneer applications, in accordance with one or more embodiments of the disclosure.
Figure 3A:
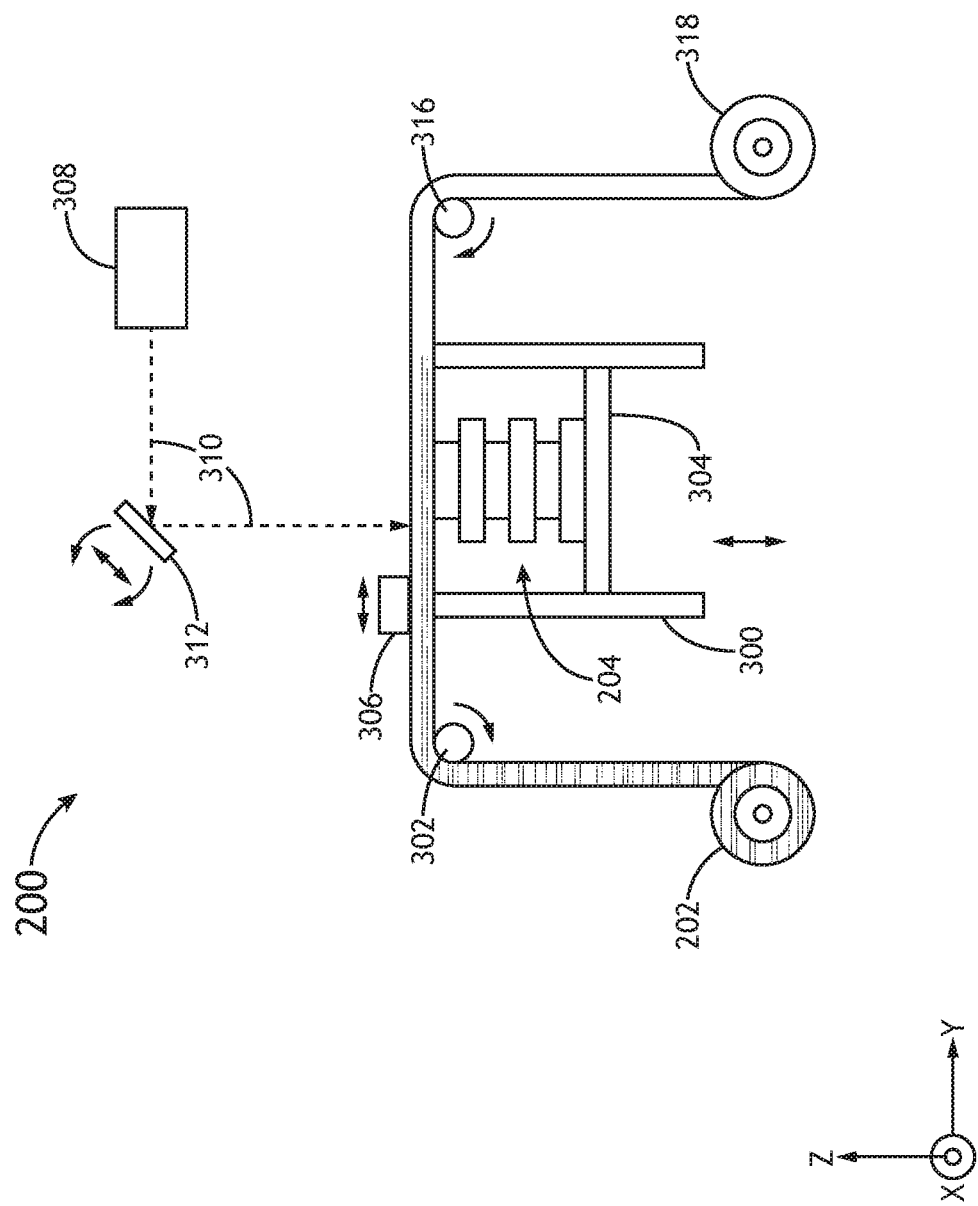
FIG. 3A illustrates a laminated object additive manufacturing device for veneer applications, in accordance with one or more embodiments of the disclosure.

FIG. 1 is a flow diagram illustrating a method or process 100 of laminated object additive manufacturing for veneer applications, in accordance with one or more embodiments of the disclosure. FIG. 2 illustrates a simplified schematic of a method or process of laminated object additive manufacturing for veneer applications, in accordance with one or more embodiments of the disclosure. FIGS. 3A and 3B illustrate a laminated object additive manufacturing device 200 for laminated object additive manufacturing for veneer applications, in accordance with one or more embodiments of the disclosure.

In a step 102, a fabricated veneer may be loaded. A fabricated veneer may be in a log or roll 202. The roll 202 may be loaded onto the laminated object additive manufacturing device 200. For example, the roll 202 may be fabricated via one or more extrusion manufacturing processes. Extrusion manufacturing for veneer applications is described in greater detail in U.S. patent application Ser. No. 16/716,949, filed Dec. 17, 2019, which is incorporated herein in the entirety.

The roll 202 may include a veneer with a particular color, design, grain width, and/or grain pattern. The veneer may be fabricated from a mixture including select material deposited to generate the particular color, design, grain width, and/or grain pattern.

The material may include raw wood product (e.g., sawdust, wood shavings, wood pulp, or other wood product).

For example, the raw wood product may be from the same source. By way of another example, the raw wood product may be from different sources. For instance, the raw wood product may be from different species of tree. In addition, the raw wood product may be from different batches of the same species of tree.

The material may include a binder (or binding agent). The binder may include, but is not limited to, a thermoplastic, an adhesive, and/or water. The adhesive may include, but is not limited to, an epoxy resin, a wood glue, or other adhesive suitable for use with wood. For example, the epoxy resin may include a clear epoxy resin that is not visible in the stack of lumber once dry. For instance, the use of an epoxy resin may allow for the color of the sheets of veneer to be replicated throughout the stack of lumber, without concern of unwanted color (e.g., a white or yellow layer). By way of another example, the epoxy resin may be a two-part epoxy resin. It is noted herein the adhesive may be in a powder, particle, and/or particulate form to mix with the wood product.

The material may include a material selected to generate a particular color, design, grain width, and/or grain pattern. For example, the material may include a dyed water-based material. By way of another example, the material may include a thermal-sensitive material. The thermal-sensitive material may be configured to activate (e.g., in the presence of heat) and generate a particular color, design, grain width, and/or grain pattern. The thermal-sensitive material may be in a powder, particle, and/or particulate form to mix with the wood product.

The material may include a fire-resistant and/or fire-retardant material. For example, the fire-resistant and/or fire-retardant material may include, but is not limited to, metal powder, metal particles, metal shavings, or other metal product. By way of another example, the fire-resistant and/or fire-retardant material may include, but is not limited to, a concrete, a silicate (e.g., a material with a chemical compound including $SiO_2$ structures), or another material with one or more fire-resistant and/or fire-retardant properties.

In a step 104, a layer of the fabricated veneer may be fed over a working surface. The laminated object additive manufacturing device 200 may include a gantry 300. The laminated object additive manufacturing device 200 may include one or more feed rollers 302 configured to feed the layer of the fabricated veneer over a working surface 304 of the gantry 300. The working surface 304 may be configured to actuate in one or more directions along one or more axes. For example, the working surface 304 may be configured to actuate along a z-axis.

In an optional step 106, the fabricated veneer may be cured. The layer may be fed over the working surface 304 at an increased temperature, such that the layer may cure as it cools to form the veneer product. The feeding at the increased temperature may be accomplished by passing the fabricated veneer proximate to one or more stationary heated plates or rollers 306 positioned prior to the working surface 304.

The layer may be applied at or below a room operating temperature, and the binder within the layer may be activated (e.g., via heat, pressure, a combination of heat and pressure, a chemical reaction, or the like) to bind the layer deposited on the working surface 304 prior to the layer curing. The activating of the binder may be accomplished by one or more actuatable heated plates or rollers 306. For example, the one or more actuatable heated plates or rollers 306 may be configured to translate in one or more directions along one or more axes. For instance, the one or more actuatable heated plates or rollers 306 may be configured to translate along a y-axis.

It is noted herein the step 106 may be considered optional as there may be no other layers to which to bind the layer, where the layer of fabricated veneer is the first layer fed over the working surface 304. Therefore, the description should not be interpreted as a limitation on the scope of the disclosure but merely an illustration.

In a step 108, the layer of fabricated veneer may be cut. Cutting the layer of fabricated veneer may form at least a portion of a veneer product 204. For example, the veneer product 204 may be one or more sheets of veneer, each sheet of veneer having a single layer. By way of another example, the veneer product 204 may be a three-dimensional structure including multiple layers of veneer.

As illustrated in FIG. 3A, the laminated object additive manufacturing device 200 may include a laser unit 308 configured to generate and transmit a laser beam 310 onto a surface of the fabricated veneer fed over the working surface 304. The laser beam 310 may be directed by one or more optical elements 312 (e.g., mirrors, lenses, or the like). For example, the one or more optical elements 312 may be configured to actuate in one or more directions along one or more axes and/or in one or more planes. For instance, the one or more optical elements 312 may be configured to translate within a yz-plane. In addition, the one or more optical elements 312 may be configured to rotate about an axis through a yz-plane.

As illustrated in FIG. 3B, the laminated object additive manufacturing device 200 may include a cutter or cutting tool 314. For example, the cutting tool 314 may include, but is not limited to, a guillotine knife or other tool configured to alter a structure through shear deformation.

The laminated object additive manufacturing device 200 may include one or more pick-up rollers 316 positioned after the working surface 304. The one or more pick-up rollers 316 may be configured to receive and/or track the used fabricated veneer to a waste spool 318.

Although embodiments of the present disclosure illustrate the laminated object additive manufacturing device 200 as including one or more feed rollers 302, it is noted herein that the fabricated veneer may feed directly from the roll 202 to the working surface 304. In addition, although embodiments of the present disclosure illustrate the laminated object additive manufacturing device 200 as including one or more pick-up rollers 316, it is noted herein that the used fabricated veneer may be picked up directly from the working surface 304 by the waste spool 318. Therefore, the description should not be interpreted as a limitation on the scope of the disclosure but merely an illustration.

In a step 110, the working surface may be actuated. The working surface 304 may be configured to actuate in one or more directions along one or more axes. For example, the working surface 304 may be configured to lower along a z-axis. For instance, the working surface 304 may be configured to lower a distance approximately equal to a thickness of the fabricated veneer, so the working surface 304 may receive an additional layer of the fabricated veneer.

In a step 112, an additional layer of the fabricated veneer may be fed over the working surface. The additional layer may be fed to the working surface 304 and positioned above the cut layer of fabricated veneer on the working surface 304.

In an optional step 114, the fabricated veneer may be cured. The additional layer may be fed to the working surface 304 and positioned above the cut layer of fabricated veneer on the working surface 304 at an increased temperature, such that the additional layer may cure as it cools to form the veneer product 204. The feeding at the increased temperature may be accomplished by passing the fabricated veneer proximate to one or more stationary heated plates or rollers 306 positioned prior to the working surface 304 and positioned above the cut layer of fabricated veneer on the working surface 304.

The additional layer may be applied at or below a room operating temperature, and the binder within the additional layer may be activated (e.g., via heat, pressure, a combination of heat and pressure, a chemical reaction, or the like) to bind the additional layer after being fed to the working surface 304 and positioned above the cut layer of fabricated veneer on the working surface 304 and prior to the layers curing. The activating of the binder may be accomplished by one or more actuatable heated plates or rollers 306. For example, the one or more actuatable heated plates or rollers 306 may be configured to translate in one or more directions along one or more axes. For instance, the one or more actuatable heated plates or rollers 306 may be configured to translate along a y-axis.

It is noted herein the step 114 may be considered optional, as it may not be desirable to bind the layer and the additional layer prior to feeding a subsequent layer in select veneer products 204. Therefore, the description should not be interpreted as a limitation on the scope of the disclosure but merely an illustration.

In a step 116, the additional layer of the fabricated veneer may be cut. The additional layer may be cut via the laser beam 310 (e.g., as illustrated in FIG. 3A) and/or the cutting tool 314 (e.g., as illustrated in FIG. 3B). Following the cutting of the additional layer, at least an additional portion of the veneer product 204 may be formed from both the layer and the additional layer.

Some or all of the method or process 100 may then be repeated until a complete veneer product 204 is formed from the fabricated veneer. For example, the process 100 may return to step 110, where the working surface 304 is actuated, before performing one or more of steps 112, 114, and/or 116.

Although embodiments of the present disclosure illustrate the steps 106 and 114 as optionally occurring before steps 108 and 116, respectively, it is noted herein the steps 106 and 114 may occur at any time during the process 100. For example, no curing of layers may occur until after all layers have been fed and cuts have been made, such that the steps 106 and 114 may occur as a single step after a final iteration of step 116. Therefore, the description should not be interpreted as a limitation on the scope of the disclosure but merely an illustration.

Figure 4:
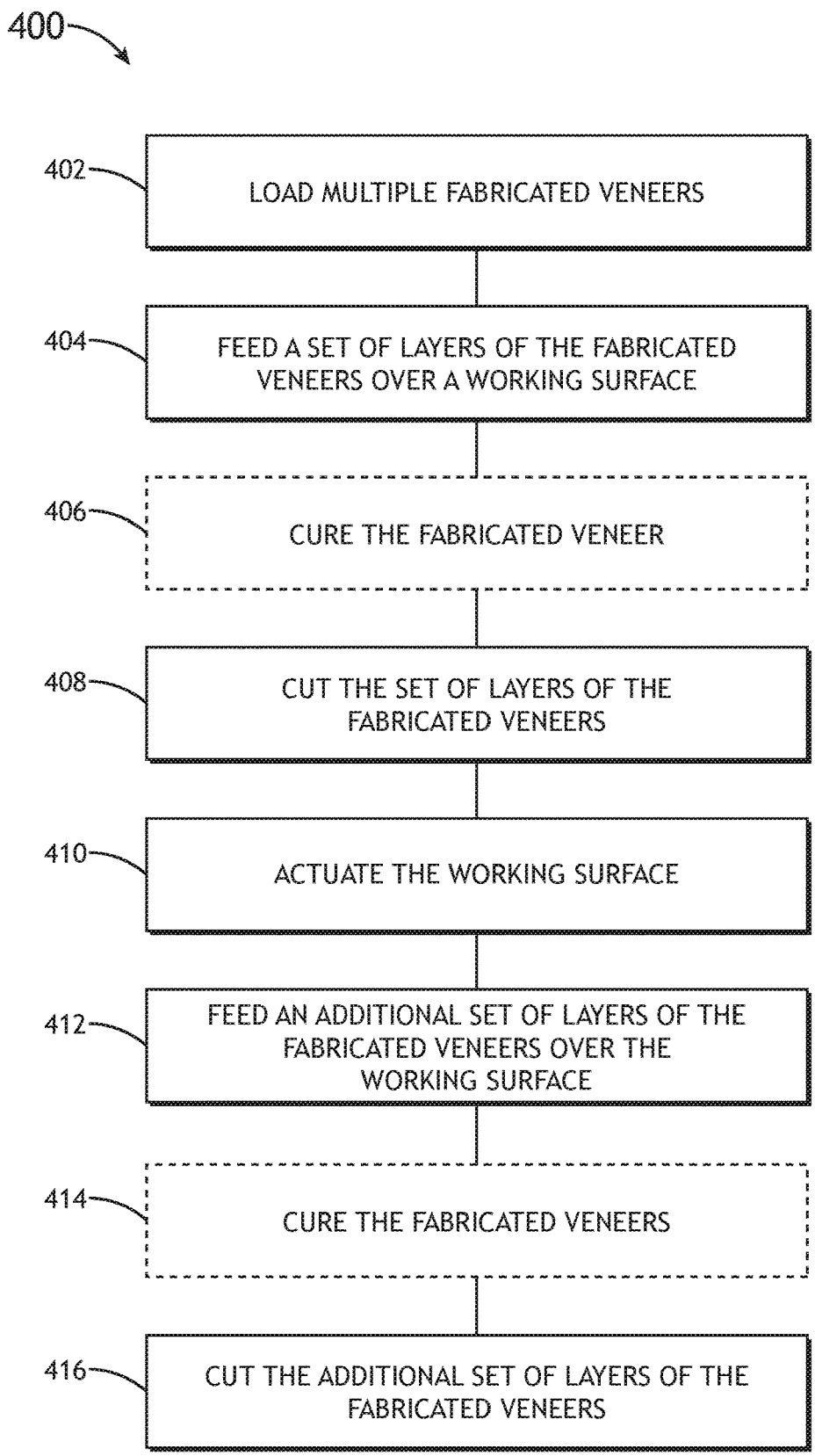
FIG. 4 is a flow diagram illustrating a method or process of laminated object additive manufacturing for veneer applications, in accordance with one or more embodiments of the disclosure.
Figure 5:
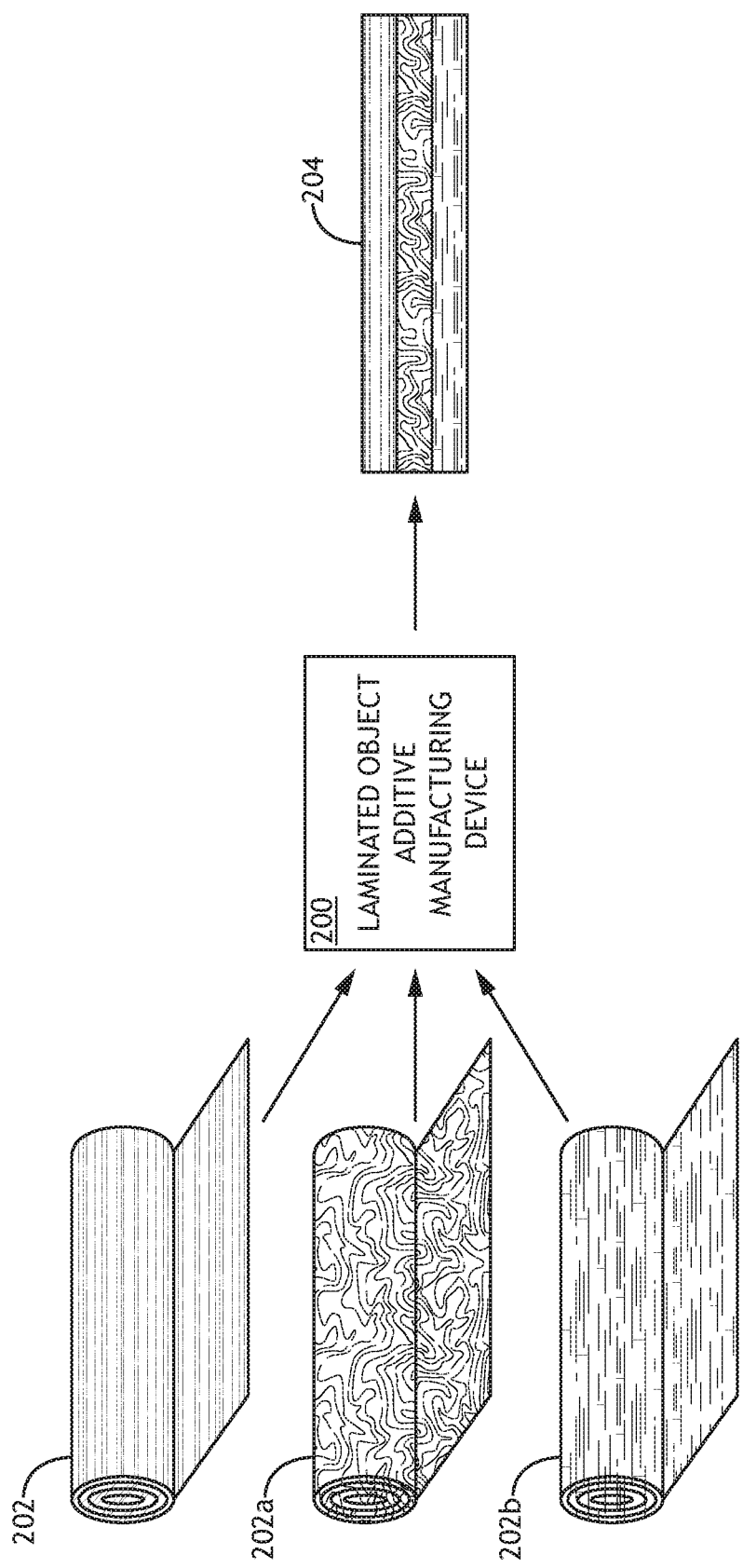
FIG. 5 is a simplified schematic illustrating a method or process of laminated object additive manufacturing for veneer applications, in accordance with one or more embodiments of the disclosure.
Figure 6A:
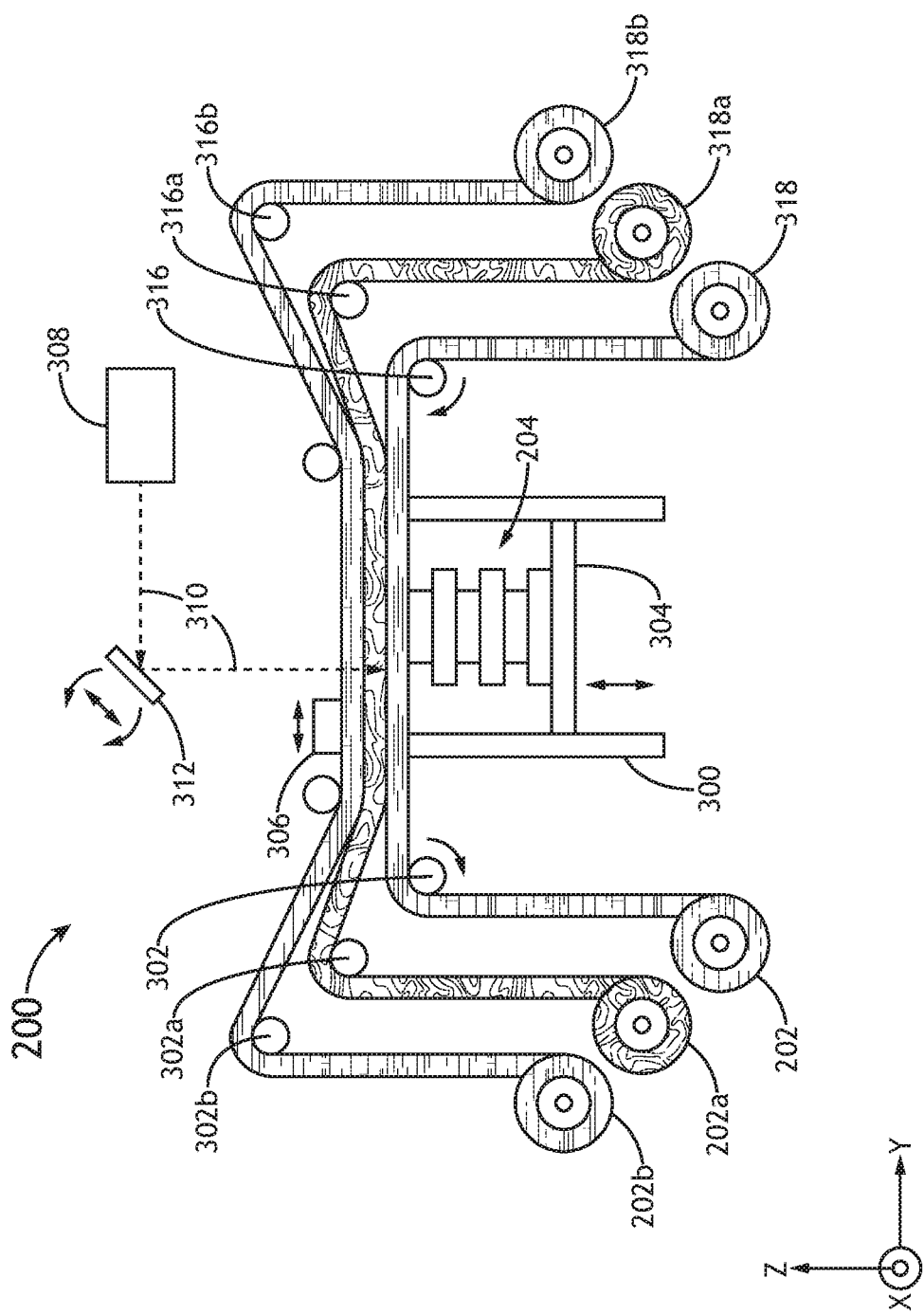
FIG. 6A illustrates a laminated object additive manufacturing device for veneer applications, in accordance with one or more embodiments of the disclosure.
Figure 6B:
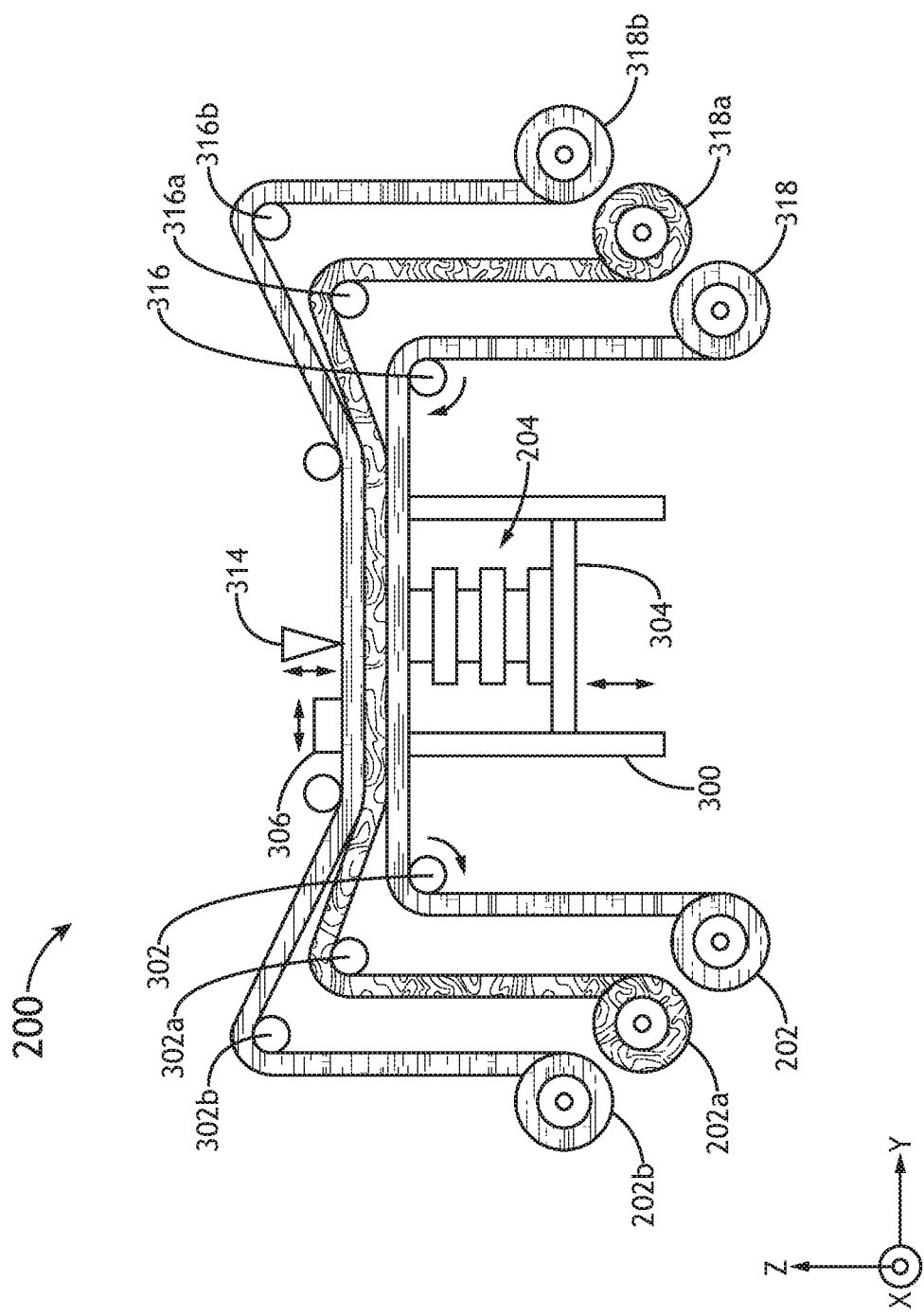
FIG. 6B illustrates a laminated object additive manufacturing device for veneer applications, in accordance with one or more embodiments of the disclosure.

FIG. 4 is a flow diagram illustrating a method or process 400 of laminated object additive manufacturing for veneer applications, in accordance with one or more embodiments of the disclosure. FIG. 5 illustrates a simplified schematic of a method or process of laminated object additive manufacturing for veneer applications, in accordance with one or more embodiments of the disclosure. FIGS. 6A and 6B illustrate a laminated object additive manufacturing device 200 for laminated object additive manufacturing for veneer applications, in accordance with one or more embodiments of the disclosure.

In a step 402, one or more fabricated veneers may be loaded. The one or more fabricated veneers may be multiple logs or rolls 202, 202a, 202b. The rolls 202, 202a, 202b may be loaded onto the laminated object additive manufacturing device 200. For example, the rolls 202, 202a, 202b may be fabricated via one or more extrusion manufacturing processes. Extrusion manufacturing for veneer applications is described in greater detail in U.S. patent application Ser. No. 16/716,949, filed Dec. 17, 2019, previously incorporated herein in the entirety.

The rolls 202, 202a, 202b may include a veneer with a particular color, design, grain width, and/or grain pattern. The veneer may be fabricated from a mixture including select material deposited to generate the particular color, design, grain width, and/or grain pattern.

The material may include raw wood product (e.g., sawdust, wood shavings, wood pulp, or other wood product). For example, the raw wood product may be from the same source. By way of another example, the raw wood product may be from different sources. For instance, the raw wood product may be from different species of tree. In addition, the raw wood product may be from different batches of the same species of tree.

The material may include a binder (or binding agent). The binder may include, but is not limited to, a thermoplastic, an adhesive, and/or water. The adhesive may include, but is not limited to, an epoxy resin, a wood glue, or other adhesive suitable for use with wood. For example, the epoxy resin may include a clear epoxy resin that is not visible in the stack of lumber once dry. For instance, the use of an epoxy resin may allow for the color of the sheets of veneer to be replicated throughout the stack of lumber, without concern of unwanted color (e.g., a white or yellow layer). By way of another example, the epoxy resin may be a two-part epoxy resin. It is noted herein the adhesive may be in a powder, particle, and/or particulate form to mix with the wood product.

The material may include a material selected to generate a particular color, design, grain width, and/or grain pattern. For example, the material may include a dyed water-based material. By way of another example, the material may include a thermal-sensitive material. The thermal-sensitive material may be configured to activate (e.g., in the presence of heat) and generate a particular color, design, grain width, and/or grain pattern. The thermal-sensitive material may be in a powder, particle, and/or particulate form to mix with the wood product.

The material may include a fire-resistant and/or fire-retardant material. For example, the fire-resistant and/or fire-retardant material may include, but is not limited to, metal powder, metal particles, metal shavings, or other metal product. By way of another example, the fire-resistant and/or fire-retardant material may include, but is not limited to, a concrete, a silicate (e.g., a material with a chemical compound including $SiO_2$ structures), or another material with one or more fire-resistant and/or fire-retardant properties.

Although embodiments of the present disclosure illustrate the laminated object additive manufacturing device 200 as configured to accept the rolls 202, 202a, 202b, it is noted herein the laminated object additive manufacturing device 200 is not limited to the rolls 202, 202a, 202b and instead may receive any number of logs. Therefore, the description should not be interpreted as a limitation on the scope of the disclosure but merely an illustration.

Although embodiments of the present disclosure illustrate the rolls 202, 202a, 202b as including a veneer with a particular color, design, grain width, and/or grain pattern, it is noted herein the rolls 202, 202a, 202b may include a pure color roll or a binder roll. For example, the roll 202 may be a pure color roll, the roll 202a may be a binder roll, and the roll 202b may include a veneer with a particular color, design, grain width, and/or grain pattern. In general, the rolls

202, 202a, 202b may be any combination of logs including a veneer with a particular color, design, grain width, and/or grain pattern, a pure color, and/or a binder. Therefore, the description should not be interpreted as a limitation on the scope of the disclosure but merely an illustration.

In a step 404, a set of layers of the fabricated veneers may be fed over a working surface. The laminated object additive manufacturing device 200 may include the gantry 300. The laminated object additive manufacturing device 200 may include one or more feed rollers 302, 302a, 302b configured to feed the set of layers of the fabricated veneer over the working surface 304 of the gantry 300. The working surface 304 may be configured to actuate in one or more directions along one or more axes. For example, the working surface 304 may be configured to actuate along a z-axis.

In an optional step 406, the fabricated veneers may be cured. The set of layers may be fed over the working surface 304 at an increased temperature, such that the layer may cure as it cools to form the veneer product 204. The feeding at the increased temperature may be accomplished by passing the fabricated veneer proximate to one or more stationary heated plates or rollers 306 positioned prior to the working surface 304.

The layer may be applied at or below a room operating temperature, and the binder within the layer may be activated (e.g., via heat, pressure, a combination of heat and pressure, a chemical reaction, or the like) to bind the layer deposited on the working surface prior to the layer curing. The activating of the binder may be accomplished by one or more actuatable heated plates or rollers 306. For example, the one or more actuatable heated plates or rollers 306 may be configured to translate in one or more directions along one or more axes. For instance, the one or more actuatable heated plates or rollers 306 may be configured to translate along a y-axis.

It is noted herein the step 406 may be considered optional as there may be no other layers to which to bind the set of layers, where the set of layers of fabricated veneer is the first set of layers fed over the working surface 304. Therefore, the description should not be interpreted as a limitation on the scope of the disclosure but merely an illustration.

In a step 408, the set of layers of fabricated veneer may be cut. Cutting the set of layers of fabricated veneer may form at least a portion of a veneer product 204. For example, the veneer product 204 may include a three-dimensional structure including multiple layers of veneer.

As illustrated in FIG. 6A, the laminated object additive manufacturing device 200 may include the laser unit 308 configured to generate and transmit the laser beam 310 onto a surface of the fabricated veneers fed over the working surface 304. The laser beam 310 may be directed by the one or more optical elements 312 (e.g., mirrors, lenses, or the like). For example, the one or more optical elements 312 may be configured to actuate in one or more directions along one or more axes and/or in one or more planes. For instance, the one or more optical elements 312 may be configured to translate within a yz-plane. In addition, the one or more optical elements 312 may be configured to rotate about an axis through a yz-plane.

As illustrated in FIG. 6B, the laminated object additive manufacturing device 200 may include the cutter or cutting tool 314 onto a surface of the fabricated veneers fed over the working surface 304. For example, the cutting tool 314 may include, but is not limited to, a guillotine knife or other tool configured to alter a structure through shear deformation.

The laminated object additive manufacturing device 200 may include one or more pick-up rollers 316, 316a, 316b positioned after the working surface 304. The one or more pick-up rollers 316, 316a, 316b may be configured to receive and/or track the used fabricated veneer to waste rollers 318, 318a, 318b.

Although embodiments of the present disclosure illustrate the laminated object additive manufacturing device 200 as including one or more feed rollers 302, 302a, 302b, it is noted herein that the fabricated veneer may feed directly from the rolls 202, 202a, 202b to the working surface 304. In addition, although embodiments of the present disclosure illustrate the laminated object additive manufacturing device 200 as including one or more pick-up rollers 316, 316a, 316b, it is noted herein that the used fabricated veneer may be picked up directly from the working surface 304 by the waste rollers 318, 318, 318b. Therefore, the description should not be interpreted as a limitation on the scope of the disclosure but merely an illustration.

In a step 410, the working surface may be actuated. The working surface 304 may be configured to actuate in one or more directions along one or more axes. For example, the working surface 304 may be configured to lower along a z-axis. For instance, the working surface 304 may be configured to lower a distance approximately equal to a thickness of the fabricated veneers, so the working surface 304 may receive an additional set of layers of the fabricated veneers.

In a step 412, an additional set of layers of the fabricated veneers may be fed over the working surface. The additional set of layers may be fed to the working surface 304 and positioned above the cut set of layers of fabricated veneers on the working surface 304.

In an optional step 414, the fabricated veneers may be cured. The additional set of layers may be fed to the working surface 304 and positioned above the cut set of layers of fabricated veneers on the working surface 304 at an increased temperature, such that the additional set of layers may cure as they cool to form the veneer product 204. The feeding at the increased temperature may be accomplished by passing the fabricated veneers proximate to one or more stationary heated plates or rollers 306 positioned prior to the working surface 304 and positioned above the cut set of layers of fabricated veneers on the working surface 304.

The additional set of layers may be applied at or below a room operating temperature, and the binder within the additional set of layers may be activated (e.g., via heat, pressure, a combination of heat and pressure, a chemical reaction, or the like) to bind the additional set of layers after being fed to the working surface 304 and positioned above the cut set of layers of fabricated veneers on the working surface 304 and prior to the layers curing. The activating of the binder may be accomplished by one or more actuatable heated plates or rollers 306. For example, the one or more actuatable heated plates or rollers 306 may be configured to translate in one or more directions along one or more axes. For instance, the one or more actuatable heated plates or rollers 306 may be configured to translate along a y-axis.

It is noted herein the step 414 may be considered optional, as it may not be desirable to bind the set of layers and the additional set of layers prior to the feeding of a subsequent set of layers. Therefore, the description should not be interpreted as a limitation on the scope of the disclosure but merely an illustration.

In a step 416, the additional set of layers of the fabricated veneers may be cut. The additional set of layers may be cut via the laser beam 310 (e.g., as illustrated in FIG. 6A) and/or the cutting tool 314 (e.g., as illustrated in FIG. 6B). Following the cutting of the additional set of layers, at least an additional portion of the veneer product 204 may be formed from both the set of layers and the additional set of layers.

Some or all of the method or process 400 may then be repeated until a complete veneer product 204 is formed from the fabricated veneers. For example, the process 400 may return to step 410, where the working surface 304 is actuated, before performing one or more of steps 412, 414, and/or 416.

Although embodiments of the present disclosure illustrate the steps 406 and 414 as optionally occurring before steps 408 and 416, respectively, it is noted herein the steps 406 and 414 may occur at any time during the process 400. For example, no curing of layers may occur until after all layers have been fed and cuts have been made, such that the steps 406 and 414 may occur as a single step after a final iteration of step 416. Therefore, the description should not be interpreted as a limitation on the scope of the disclosure but merely an illustration.

Figure 7:
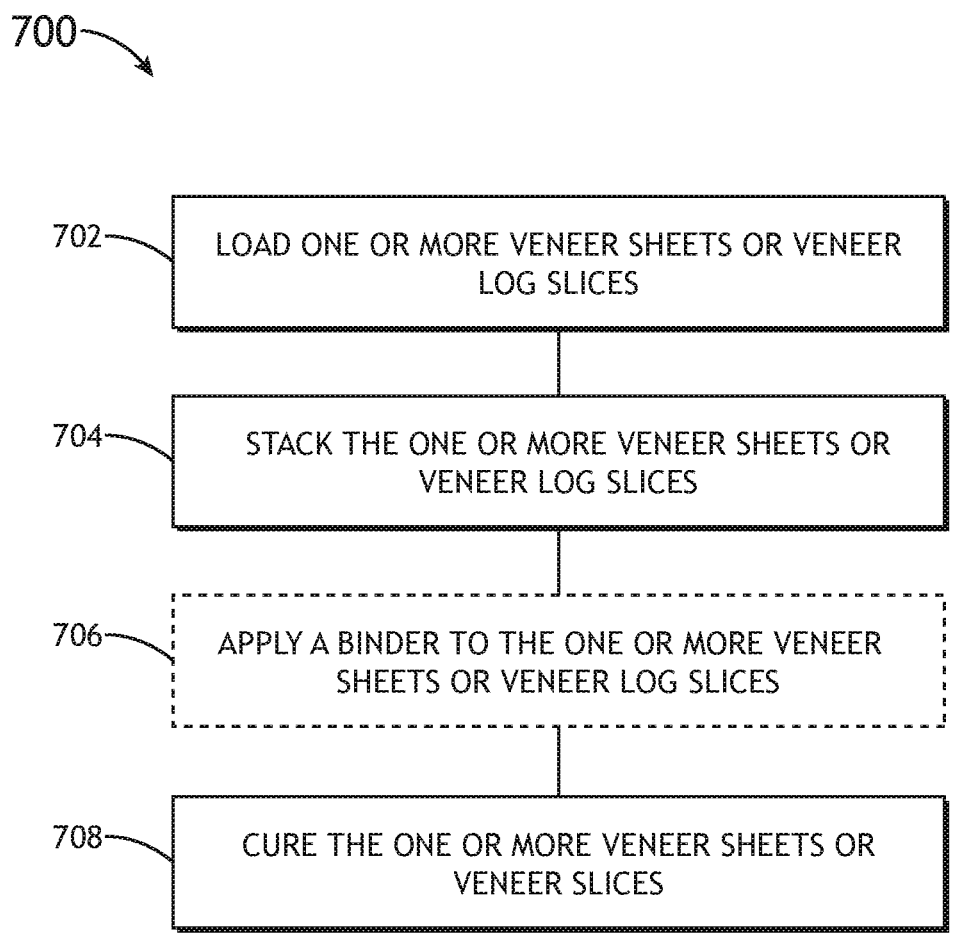
FIG. 7 is a flow diagram illustrating a method or process of laminated object additive manufacturing for veneer applications, in accordance with one or more embodiments of the disclosure.
Figure 8:
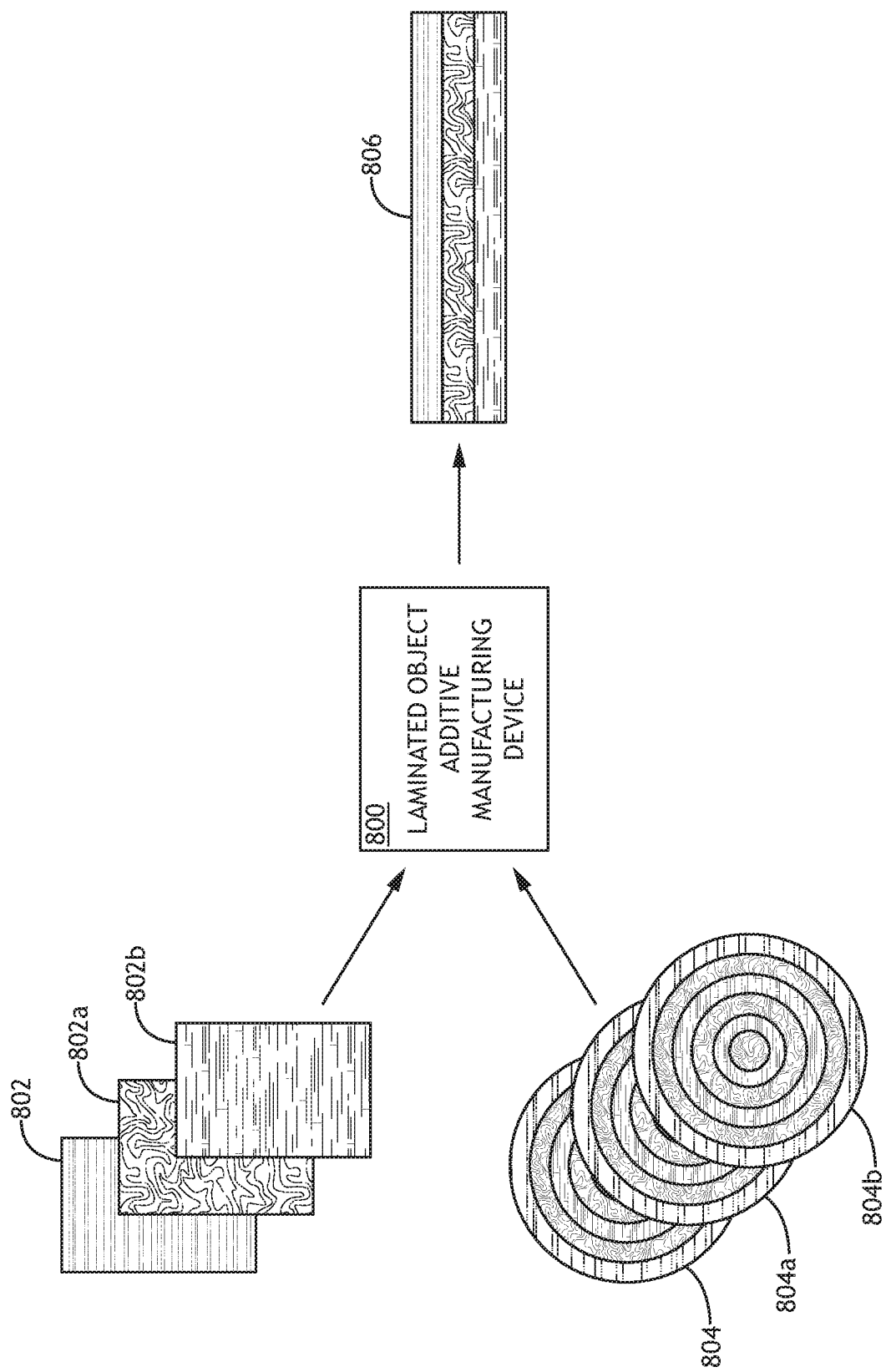
FIG. 8 is a simplified schematic illustrating a method or process of laminated object additive manufacturing for veneer applications, in accordance with one or more embodiments of the disclosure.

FIG. 7 is a flow diagram illustrating a method or process 700 of laminated object additive manufacturing for veneer applications, in accordance with one or more embodiments of the disclosure. FIG. 8 illustrates a simplified schematic of a method or process of laminated object additive manufacturing for veneer applications, in accordance with one or more embodiments of the disclosure.

In a step 702, one or more veneer sheets or veneer log slices may be loaded. The fabricated veneer may include one or more veneer sheets 802, 802a, 802b loaded into a laminated object additive manufacturing device 800. For example, the one or more veneer sheets 802, 802a, 802b may be fabricated via one or more extrusion manufacturing processes. The fabricated veneer may be one or more veneer log slices 804, 804a, 804b loaded into the laminated object additive manufacturing device 800. For example, the one or more veneer log slices 804, 804a, 804b may be fabricated via one or more extrusion manufacturing processes. Extrusion manufacturing for veneer applications is described in greater detail in U.S. patent application Ser. No. 16/716,949, filed Dec. 17, 2019, previously incorporated herein in the entirety.

The one or more veneer sheets 802, 802a, 802b and/or the one or more veneer log slices 804, 804a, 804b may include a veneer with a particular color, design, grain width, and/or grain pattern. The veneer may be fabricated from a mixture including select material deposited to generate the particular color, design, grain width, and/or grain pattern.

The material may include raw wood product (e.g., sawdust, wood shavings, wood pulp, or other wood product). For example, the raw wood product may be from the same source. By way of another example, the raw wood product may be from different sources. For instance, the raw wood product may be from different species of tree. In addition, the raw wood product may be from different batches of the same species of tree.

The material may include a binder (or binding agent). The binder may include, but is not limited to, a thermoplastic, an adhesive, and/or water. The adhesive may include, but is not limited to, an epoxy resin, a wood glue, or other adhesive suitable for use with wood. For example, the epoxy resin may include a clear epoxy resin that is not visible in the stack of lumber once dry. For instance, the use of an epoxy resin may allow for the color of the sheets of veneer to be replicated throughout the stack of lumber, without concern of unwanted color (e.g., a white or yellow layer). By way of another example, the epoxy resin may be a two-part epoxy resin. It is noted herein the adhesive may be in a powder, particle, and/or particulate form to mix with the wood product.

The material may include a material selected to generate a particular color, design, grain width, and/or grain pattern. For example, the material may include a dyed water-based material. By way of another example, the material may include a thermal-sensitive material. The thermal-sensitive material may be configured to activate (e.g., in the presence of heat) and generate a particular color, design, grain width, and/or grain pattern. The thermal-sensitive material may be in a powder, particle, and/or particulate form to mix with the wood product.

The material may include a fire-resistant and/or fire-retardant material. For example, the fire-resistant and/or fire-retardant material may include, but is not limited to, metal powder, metal particles, metal shavings, or other metal product. By way of another example, the fire-resistant and/or fire-retardant material may include, but is not limited to, a concrete, a silicate (e.g., a material with a chemical compound including $SiO_2$ structures), or another material with one or more fire-resistant and/or fire-retardant properties.

Although embodiments of the present disclosure illustrate the laminated object additive manufacturing device 800 as configured to accept the one or more veneer sheets 802, 802a, 802b and/or the one or more veneer log slices 804, 804a, 804b, it is noted herein the laminated object additive manufacturing device 800 is not limited to the one or more veneer sheets 802, 802a, 802b and/or the one or more veneer log slices 804, 804a, 804b and instead may receive any number of veneer sheets and/or veneer log slices. Therefore, the description should not be interpreted as a limitation on the scope of the disclosure but merely an illustration.

Although embodiments of the present disclosure illustrate the one or more veneer sheets 802, 802a, 802b and/or the one or more veneer log slices 804, 804a, 804b as including a veneer with a particular color, design, grain width, and/or grain pattern, it is noted herein the one or more veneer sheets 802, 802a, 802b and/or the one or more veneer log slices 804, 804a, 804b may include a pure color roll or a binder roll. For example, the veneer sheet 802 and/or the veneer log slice 804 may be of a pure color, the veneer sheet 802a and/or the veneer log slice 804a may be a binder, and the veneer sheet 802b and/or the veneer log slice 804b may include a veneer with a particular color, design, grain width, and/or grain pattern. In general, the one or more veneer sheets 802, 802a, 802b and/or the one or more veneer log slices 804, 804a, 804b may be any combination of logs including a veneer with a particular color, design, grain width, and/or grain pattern, a pure color, and/or a binder. Therefore, the description should not be interpreted as a limitation on the scope of the disclosure but merely an illustration.

In a step 704, the one or more veneer sheets or one or more veneer log slices may be stacked. The one or more veneer sheets 802, 802a, 802b and/or the one or more veneer log slices 804, 804a, 804b may be passed from a feed tray of the laminated object additive manufacturing device 800 to a curing tray of the laminated object additive manufacturing device 800.

In an optional step 706, a binder may be applied to the one or more veneer sheets or one or more veneer log slices. A binder (or binding agent) may be applied to the one or more veneer sheets 802, 802a, 802b and/or the one or more veneer log slices 804, 804a, 804b (e.g., via one or more plates or rollers) as they pass from the feed tray to the curing tray.

It is noted herein the step 706 may be optional as the application of the binder may not be necessary. Instead, the one or more veneer sheets 802, 802a, 802b and/or the one or more veneer log slices 804, 804a, 804b may already include the binder necessary, which may be activated prior to curing to form the veneer product 204. Therefore, the above description should not be interpreted as a limitation on the scope of the disclosure but merely an illustration.

In a step 708, the one or more veneer sheets or one or more veneer log slices may be cured. Following the application of the binder, the one or more veneer sheets 802, 802a, 802b and/or the one or more veneer log slices 804, 804a, 804b may each be fed over one or more stationary plates or rollers having an increased temperature, such that the one or more veneer sheets 802, 802a, 802b and/or the one or more veneer log slices 804, 804a, 804b may cure as they are stacked and cooled to form at least a portion of a veneer product 806 within the curing tray.

The one or more veneer sheets 802, 802a, 802b and/or the one or more veneer log slices 804, 804a, 804b may be stacked at or below a room operating temperature, and the binder within the one or more veneer sheets 802, 802a, 802b and/or the one or more veneer log slices 804, 804a, 804b may be activated (e.g., via heat, pressure, a combination of heat and pressure, a chemical reaction, or the like) to bind the one or more veneer sheets 802, 802a, 802b and/or the one or more veneer log slices 804, 804a, 804b prior to the one or more veneer sheets 802, 802a, 802b and/or the one or more veneer log slices 804, 804a, 804b curing. The activating of the binder may be accomplished by one or more actuatable heated plates or rollers. For example, the one or more actuatable heated plates or rollers may be configured to translate in one or more directions along one or more axes.

In a step to the processes 100, 400, 700, the veneer products 204, 806 may be firetreated. For example, the veneer products 204, 806 may be treated with a fire-resistant and/or fire-retardant material. By way of another example, the veneer products 204, 806 may be treated with fire. Where the veneer products 204, 806 is a single sheet of veneer or a three-dimensional structure, the veneer products 204, 806 may be firetreated as a single component. Where the veneer products 204, 806 includes multiple sheets of veneer, each sheet of veneer may be firetreated individually, in batches, or in bulk. It is noted herein, however, that where the generated mixture used to fabricate the veneer products 204, 806 includes a heat-sensitive compound such as a thermoplastic, that firetreating may alter (e.g., re-melt, re-cure, or the like) the heat-sensitive compound.

In a step of the processes 100, 400, 700, a coating may be applied to the veneers product 204, 806. For example, the coating may include an infiltrant, a sealant, or other coating configured to protect the veneer products 204, 806. For instance, the infiltrant may include an adhesive configured to fill in pores, gaps, cracks, or other imperfections that may reduce the strength of the veneer products 204, 806.

It is noted herein the processes 100, 400, 700 are not limited to the steps and/or sub-steps provided. The processes 100, 400, 700 may include more or fewer steps and/or sub-steps. The processes 100, 400, 700 may perform the steps and/or sub-steps simultaneously. The processes 100, 400, 700 may perform the steps and/or sub-steps sequentially, including in the order provided or an order other than provided. Therefore, the above description should not be interpreted as a limitation on the scope of the disclosure but merely an illustration.

In this regard, a veneer product 204, 806 with a selected color, design, grain width, and/or grain pattern may be digitally designed without being reliant upon natural resources and/or a limited supply. The veneer product 204, 806 may include a color, design, grain width, and/or grain pattern recreated based on a veneer selected or provided by a user (e.g., a consumer, manufacturer, or other individual involved with the selection of the veneer being sequenced). The veneer product 204, 806 may be repeatably fabricated to ensure a consistency of a component aesthetic mass-produced for, disseminated for, and/or installed within a vehicle (e.g., an aircraft, an automobile, or the like). The ability to repeatably fabricate the veneer product 204, 806 may allow for the repair and/or replacement of an original product with an exact duplicate of the original product. The ability to repeatably fabricate the veneer product 204, 806 may result in bulk production, production on demand, the ability to maintain a digital inventory, and/or potential cost savings (e.g., in the form of material collection and use, or the like).

Figure 9:
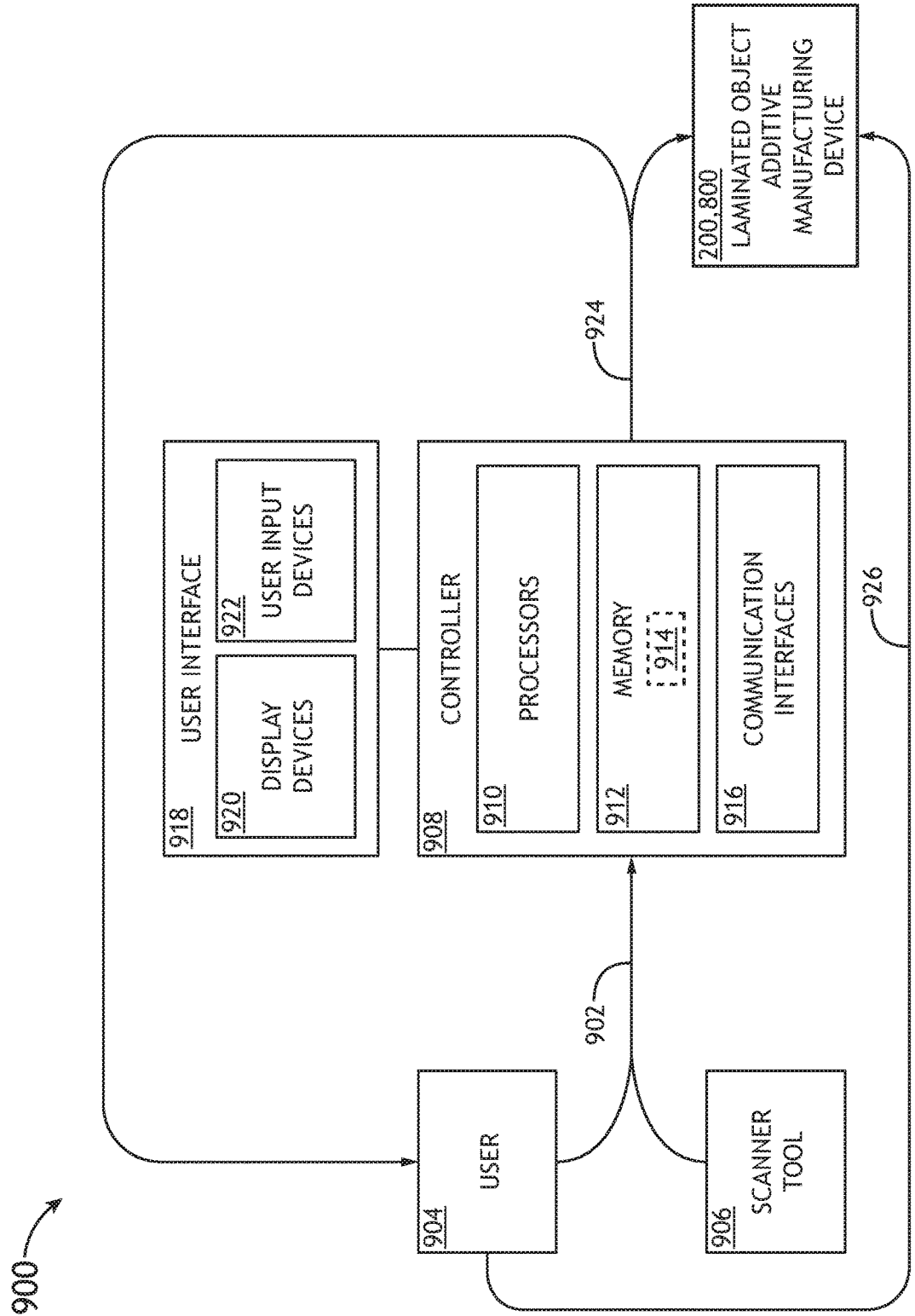
FIG. 9 illustrates a system used for laminated object additive manufacturing for veneer applications, in accordance with one or more embodiments of the disclosure.

FIG. 9 illustrates a system 900 used for laminated object additive manufacturing for veneer applications, in accordance with one or more embodiments of the present disclosure.

A set of data 902 may be transmitted through the system 900. The set of data 902 may include data defining a particular color, design, grain pattern, and/or grain width for veneer of the veneer product 204, 806. The set of data 902 may be received from a user 904. For example, the user 904 may include a consumer, a manufacturer, or other individual involved with the selection of the veneer of the veneer product 204, 806. It is noted herein the set of data 902 may be received by the one or more controllers 908 either directly or indirectly (e.g., through an intermediary, where the consumer passes the set of data 902 to the manufacturer and the manufacturer uploads the data).

The set of data 902 may be received from a scanning tool 906. For example, where the veneer product 204, 806 needs to match a previously-used and/or installed veneer product 204, 806 in a vehicle (e.g., airplane, automobile, or the like), the color, design, grain width, and/or grain pattern of the veneer of the veneer product 204, 806 may be scanned with a scanning tool 906 to generate the set of data 902.

The set of data 902 may be received by one or more controllers 908. The one or more controllers 908 may include may include at least one of one or more processors 910, memory 912 configured to store one or more sets of program instructions 914, and/or one or more communication interfaces 916.

The one or more processors 910 provides processing functionality for at least the one or more controllers 908 and may include any number of processors, micro-controllers, circuitry, field programmable gate array (FPGA) or other processing systems, and resident or external memory for storing data, executable code, and other information accessed or generated by the one or more controllers 908. The one or more processors 910 may execute one or more software programs (e.g., the one or more sets of program instructions 914) embodied in a non-transitory computer readable medium (e.g., the memory 912) that implement techniques described herein. The one or more processors 910 are not limited by the materials from which it is formed or the processing mechanisms employed therein and, as such, may be implemented via semiconductor(s) and/or transistors (e.g., using electronic integrated circuit (IC) components), and so forth.

The memory 912 may be an example of tangible, computer-readable storage medium that provides storage functionality to store various data and/or program code associated with operation of the one or more controllers 908 and/or one or more processors 910, such as software programs and/or code segments, or other data to instruct the one or more processors 910 and/or other components of the one or more controllers 908, to perform the functionality described herein. Thus, the memory 912 may store data, such as a program of instructions for operating the one or more controllers 908, including its components (e.g., one or more processors 910, the one or more communication interfaces 916, or the like), and so forth. It should be noted that while a single memory 912 is described, a wide variety of types and combinations of memory (e.g., tangible, non-transitory memory) may be employed. The memory 912 may be integral with the one or more processors 910, may include stand-alone memory, or may be a combination of both. Some examples of the memory 912 may include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The one or more controllers 908 may be configured to perform one or more process steps, as defined by the one or more sets of program instructions 914. The one or more process steps may be performed iteratively, concurrently, and/or sequentially. The one or more sets of program instructions 914 may be configured to operate via a control algorithm, a neural network (e.g., with states represented as nodes and hidden nodes and transitioning between them until an output is reached via branch metrics), a kernel-based classification method, a Support Vector Machine (SVM) approach, canonical-correlation analysis (CCA), factor analysis, flexible discriminant analysis (FDA), principal component analysis (PCA), multidimensional scaling (MDS), principal component regression (PCR), projection pursuit, data mining, prediction-making, exploratory data analysis, supervised learning analysis, boolean logic (e.g., resulting in an output of a complete truth or complete false value), fuzzy logic (e.g., resulting in an output of one or more partial truth values instead of a complete truth or complete false value), or the like. For example, in the case of a control algorithm, the one or more sets of program instructions 914 may be configured to operate via proportional control, feedback control, feedforward control, integral control, proportional-derivative (PD) control, proportional-integral (PI) control, proportional-integral-derivative (PID) control, or the like.

The one or more communication interfaces 916 may be operatively configured to communicate with components of the one or more controllers 908. For example, the one or more communication interfaces 916 may be configured to retrieve data from the one or more processors 910 or other devices, transmit data for storage in the memory 912, retrieve data from storage in the memory 912, and so forth. The one or more communication interfaces 916 may also be coupled (e.g., physically, electrically, and/or communicatively) with the one or more processors 910 to facilitate data transfer between components of the one or more controllers 908 and the one or more processors 910. It should be noted that while the one or more communication interfaces 916 is described as a component of the one or more controllers 908, one or more components of the one or more communication interfaces 916 may be implemented as external components coupled (e.g., physically, electrically, and/or communicatively) to the one or more controllers 908 via a wired and/or wireless connection. The one or more controllers 908 may also include and/or connect to one or more input/output (I/O) devices. In some embodiments, the one or more communication interfaces 916 includes or is coupled (e.g., physically, electrically, and/or communicatively) to a transmitter, receiver, transceiver, physical connection interface, or any combination thereof.

The one or more controllers 908 may be coupled (e.g., physically, electrically, and/or communicatively) to one or more user interfaces 918. The one or more user interfaces 918 may include and/or be configured to interact with one or more display devices 920. The one or more user interfaces 918 may include and/or be configured to interact with one or more user input devices 922.

The one or more communication interfaces 916 may be operatively configured to communicate with one or more user interfaces 918. The one or more controllers 908 and the one or more user interfaces 918 may be separate components (e.g., have separate housings and/or separate chassis). It is noted herein, however, that the one or more controllers 908 and the one or more user interfaces 918 may be components integrated in a single housing and/or on a single chassis.

The one or more display devices 920 may include any display device known in the art. For example, the one or more display devices 920 may include, but are not limited to, a liquid crystal display (LCD), a light-emitting diode (LED) display, an organic light-emitting diode (OLED) based display, or the like. Those skilled in the art should recognize that a variety of display devices 920 may be suitable for implementation in the disclosure and the particular choice of display device may depend on a variety of factors, including, but not limited to, form factor, cost, and the like. In a general sense, any display device capable of integration with the one or more user input devices 922 (e.g., touchscreen, bezel mounted interface, keyboard, mouse, trackpad, and the like) is suitable for implementation in the disclosure.

The one or more user input devices 922 may include any data input device known in the art. For example, the one or more user input devices 922 may include, but are not limited to, a keyboard, a keypad, a touchscreen, a lever, a knob, a scroll wheel, a track ball, a switch, a dial, a sliding bar, a scroll bar, a slide, a touch pad, a paddle, a steering wheel, a joystick, a button, a bezel input device or the like. In the case of a touchscreen interface, those skilled in the art should recognize that a large number of touchscreen interfaces may be suitable for implementation in the disclosure. For instance, a display device may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the disclosure.

The one or more communication interfaces 916 may be operatively configured to communicate with components of the scanning tool 906.

The one or more communication interfaces 916 may be operatively coupled (e.g., physically, electrically, and/or communicatively) with components of the laminated object additive manufacturing devices 200, 800. For example, the one or more controllers 908 may be configured to adjust one or more operational parameters 924 for the laminated object additive manufacturing devices 200, 800. For instance, the one or more operational parameters 924 may include operational parameters for the one or more feed rollers 302, the working surface 304, the actuatable heated plates or rollers 306, the laser unit 308, the one or more optical elements 312, the cutting tool 314, the one or more pick-up rollers 316, and/or the waste spool 318 as illustrated in FIGS. 3A, 3B, 6A, and 6B, or other components of the laminated object manufacturing devices 200, 800 (e.g., actuation speed, actuation direction along an axis and/or within a plane, position within or proximate to the laminated object additive manufacturing devices 200, 800, or the like).

Although embodiments of the present disclosure illustrate the one or more controllers 908 as adjusting the one or more operational parameters 924 of the laminated object additive manufacturing devices 200, 800, it is noted herein the one or more operational parameters may be adjusted via manual controls or manual instructions 926 from the user 904. Therefore, the description should not be interpreted as a limitation on the scope of the disclosure but merely an illustration.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A method of laminated object additive manufacturing for veneer applications, comprising:
    loading at least one veneer into a laminated object additive manufacturing device, the at least one veneer being fabricated from a mixture including wood product and a binder;
    feeding a first layer of the at least one veneer over a working surface of the laminated object additive manufacturing device;
    cutting the first layer of the at least one veneer to form a first portion of a veneer product;
    laminating the first layer;
    actuating the working surface;
    feeding an additional layer of the at least one veneer over the first layer of the at least one veneer;
    cutting the additional layer of the at least one veneer to form an additional portion of the veneer product;
    adjusting one or more operational parameters of the laminated object additive manufacturing device via a controller;
    forming at least one of a veneer block or a veneer log;
    slicing the at least one of the veneer block or the veneer log, wherein slicing the at least one of the veneer block or the veneer log generates a secondary veneer; and
    loading the secondary veneer into the laminated object additive manufacturing device.

2. The method of claim 1, further comprising:
    curing the first layer to form the first portion of the veneer product.

3. The method of claim 1, further comprising:
    curing the first layer and the additional layer to form the additional portion of the veneer product.

4. The method of claim 1, the at least one veneer including a plurality of veneers, the method further comprising:
    feeding a first layer of each of the plurality of veneers over the working surface of the laminated object additive manufacturing device;
    cutting the first layer of each of the plurality of veneers to form a portion of the veneer product;
    laminating the first layer;
    actuating the working surface;
    feeding an additional layer of each of the plurality of veneers over a first set of layers of the plurality of veneers; and
    cutting the additional layer of each of the plurality of veneers to form the additional portion of the veneer product.

5. The method of claim 4, further comprising:
    curing the first layer of each of the plurality of veneers to form the first portion of the veneer product.

6. The method of claim 4, further comprising:
    curing the first layer of each of the plurality of veneers and the additional layer of each of the plurality of veneers to form the additional portion of the veneer product.

7. The method of claim 1, the at least one veneer including at least one roll of veneer.

8. The method of claim 1, the binder being a thermoplastic.

9. The method of claim 1, the binder being an adhesive.

10. The method of claim 1, the mixture further including at least one of a fire-retardant or a fire-resistant material.

11. The method of claim 10, the mixture further including a metal.

12. A method of laminated object additive manufacturing for veneer applications, comprising:
    loading at least one veneer into a laminated object additive manufacturing device, the at least one veneer being fabricated from wood product and a binder, the at least one veneer loaded into a feed tray of the laminated object additive manufacturing device;
    laminating the at least one veneer;
    stacking the at least one veneer within a curing tray of the laminated object additive manufacturing device;
    curing the at least one veneer to form at least a portion of a veneer product; and
    adjusting one or more operational parameters of the laminated object additive manufacturing devices via a controller;
    forming at least one of a veneer block or a veneer log;
    slicing the at least one of the veneer block or the veneer log, wherein slicing the at least one of the veneer block or the veneer log generates a secondary veneer; and
    loading the secondary veneer into the laminated object additive manufacturing device.

13. The method of claim 12, the at least one veneer including a plurality of sheets of veneer.

14. The method of claim 12, the at least one veneer including a plurality of veneer log slices.

15. The method of claim 1, wherein the wood product includes at least one of wood chips or wood powder, wherein the binder includes an adhesive configured as an epoxy resin.

16. The method of claim 12, further comprising:
    applying an additional binder to the at least one veneer while the at least one veneer passes from the feed tray to the curing tray.

* * * * *